United States Patent
Kondo et al.

[15] 3,665,022
[45] May 23, 1972

[54] DEGRADATION OF SIDE CHAIN IN SAPOGENINS

[72] Inventors: Eiji Kondo, Ikeda-shi, Osaka; Takashi Mitsugi, Senboku-gun, Osaka, both of Japan

[73] Assignee: Shionogi & Co., Ltd., Osaka, Japan

[22] Filed: Sept. 2, 1969

[21] Appl. No.: 854,769

Related U.S. Application Data

[63] Continuation-in-part of Ser. No. 597,216, Nov. 28, 1966, abandoned.

[52] U.S. Cl. ............... 260/397.3, 260/239.55 C, 260/397.4, 260/397.45, 260/397.5, 195/51
[51] Int. Cl. ........................................................ C07c 169/20
[58] Field of Search ................................. 260/397.3, 397.4

[56] References Cited

UNITED STATES PATENTS 3,575,810   4/1971   Matsushima ........................... 195/51

*Primary Examiner*—Elbert L. Roberts
*Attorney*—Wenderoth, Lind & Ponack

[57] ABSTRACT

Compounds of the formula

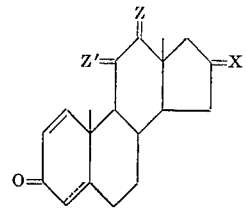

wherein X is oxo, lower alkylenedioxy, di(lower alkoxy), or $<^{OR'}_H$ in which R' is hydrogen or acyl; one of Z and Z' is oxo or $<^{OR}_H$ in which R is hydrogen or acyl, and the other is $<^H_H$; and the dotted line represents the presence or absence of a double bond are useful as intermediates for preparing a wide variety of androstranes and estranes, including testosterone, esterone, estradiol, etc., in per se known manner.

18 Claims, No Drawings

DEGRADATION OF SIDE CHAIN IN SAPOGENINS

This application is a continuation-in-part of our application Ser. No. 597,216, filed Nov. 28, 1966 now abandoned.

The present invention relates to the degradation reaction of the side chain of steroidal sapogenins. More particularly, it relates to a microbiological transformation of spirostane series steroidal sapogenins into androstane compounds.

Several investigations dealing with the microbiological transformation of spirostane series steroidal sapogenins have been reported. However, the practical utilization of microorganisms in the direct degradation of the spirostane side chain to produce the corresponding androstane compounds has not been reported so far. The present invention provides, for the first time, a successful microbiological degradation of spirostane series steroidal sapogenins utilizing Fusarium fungi and the products, novel 16-oxygenated androstane compounds useful as intermediates for steroidal hormones.

It is a general object of the present invention to provide a new microbiological transformation of spirostane series sapogenins. It is another object to provide a new route for production of the androstane series steroidal intermediates, from the spirostane series sapogenins. Another object is to provide an industrially available excellent production method of androstane series intermediates from naturally occurring abundant steroidal materials. Another object is to utilize a novel microbiological transformation in the steroidal partial synthesis. Another object is to provide a new high yield process for the conversion of spirostanes to androstanes consisting of a single microbiological treatment. Another object is to provide novel androstane compounds. The other objects will be apparent from the following disclosures.

The process of the present invention can illustratively be represented by the following reaction scheme represented by the partial formulas including isomers at $C_{20}$, $C_{22}$ and $C_{25}$ and excluding A-C rings of steroidal nucleus, wherein R is a hydrogen atom or OR' group, R' is a hydrogen atom or an enzymatically acceptable acyl group, and X is

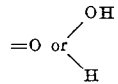

group; the said enzymatically acceptable acyl includes lower alkoxycarbonyl groups and lower aliphatic carboxylic acyl groups:

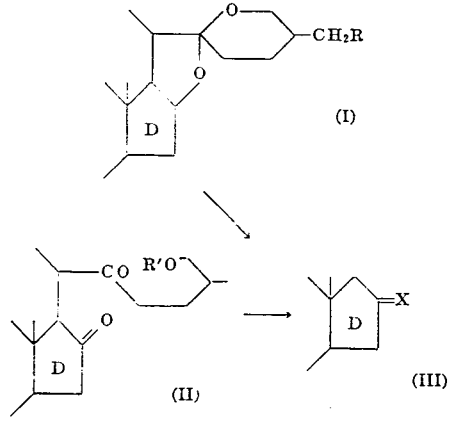

The starting materials of the present invention are the steroid compounds having partial formula either I or II. The steroid nucleus of the starting materials may possess additional substituent (s) on A, B or C ring, for example, hydroxyl group (s), acyloxy groups (s), oxo group (s), unsaturation (s), etc. Especially, the following compounds can be utilized as the starting materials in the present invention: Agapanthagenin, agavogenin, botogenin (gentrogenin), cacogenin, chlorogenin, cholegenin, cologenin, correllogenin, 9-dehydrogecogenin, 9-dehydromanogenin, diosgenin, diosgenone, gitegenin, hecogenin, isocholegenin, isorhodeasapogenin, jimogenin, kammogenin, kitigenin, kogagenin, kryptogenin, dihydrokryptogenin, lilagenin, lubigenin, magogenin, manogenin, marcogenin, metagenin, metagenone, mexogenin, neobotogenin, neochlorogenin, neohecogenin, neoruscogenin, neotigogenin, nogiragenin, rhodeasapogenin, ricogenin, rockogenin, ruscogenin, samogenin, sarsasapogenin, sisalagenin, smilagenin, tigogenin, anhydrodehydro-$\Delta$3,5-tigogenin, tokorogenin, willagenin, yamogenin, yonogenin, yuccagenin and their dehydro and dihydro derivatives and the enzymatically acceptable acyl esters thereof, which are summarized by the following general formula indicating partial structure inclusive of rings A, B and C:

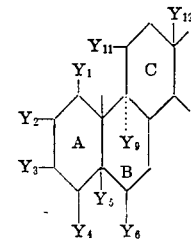

(IV)

wherein $Y_{1-12}$ each represents a hydrogen atom, a hydroxyl group or an enzymatically acceptable acyloxy group or, excluding $Y_5$ and $Y_6$, represents an oxo group, and when $Y_{1-12}$ each is a hydrogen atom, a hydroxyl group or an enzymatically acceptable acyloxy group they each may be accompanied with an unsaturation between the neighboring carbon atom, whereby each configuration of $Y_{1-12}$ is $\alpha$ or $\beta$ except for $Y_9$ as $\alpha$.

As to the enzymatically acceptable acyl group, for example, methoxycarbonyl, ethoxycarbonyl, formyl, acetyl, propionyl or the like can be illustrated.

Generally, the dehydro derivative among these substrates (especially $\Delta^4$-3-oxo or $\Delta^{1,4}$-3-oxo derivatives) and the compounds having the partial formula II are transformed more easily and can be utilized as inducers in order to facilitate the transformation of the other starting materials.

As for the fungi belonging to Fusarium genus, more particularly, F. solani, F. avenaceum, F. conglutinans, F. vasinfectum, F. carcasicum, and the variations or mutants thereof may preferably be utilized.

In order to obtain desirable growth of microorganisms belonging to Fusarium genus for the process of the present invention, a conventional nutrient medium is used, which, consists of suitable carbon sources, organic or inorganic nitrogen sources, co-factors and inorganic salts conventionally used in fermentation techniques. Carbon sources may be glucose, sucrose, dextrins, starch, glycerol etc., organic nitrogen sources may be peptone, casein, lact-alubumin hydrolysate (Edamin, Scheffield Enzymatic), casein hydrolysate (N-Z amin), yeast, yeast extract (Difco), corn steep liquor and like, and inorganic nitrogen sources, ammonium nitrate, ammonium phosphate, ammonium sulfate, sodium nitrate and the like.

The propagation of the fungus belonging to Fusarium genus is carried out in a suitable nutrient medium by stationary culture, but more preferably by shaking, stirring or submerged culture with aeration. The condition of propagation — i.e. duration, temperature, pH, composition of nutrient medium or the like — may be selected from the conventional order suitably depending on the nature and quantities of the starting materials.

After the propagation of the microorganism, the living cells in the nutrient medium may be brought to contact with the starting material, which is added as a solution or suspension in acetone, methanol, ethanol, ethylene glycol, propylene glycol, dimethylformamide or the like, with or without the presence of detergent or surface active agent, under aerobic condition.

Alternatively, the oxidation reaction can be carried out in an undernutrient or nutrient lack medium. For example, the reaction can be carried out in a suspension of mycelia (including spore; throughout the specification) in distilled water, common water, a buffer solution, saline water or the like; the mycelia is precultured for suitable period to propagate, isolated by centrifugation, filtration with suction or the like, followed by washing with distilled water, a buffered solution, or the like to remove adhering substances on need.

Instead of the mycelia, a homogenate of the mycelia or theisolated enzyme, which are obtainable by the conventional method from the mycelium, may be utilized in this invention.

It is to be understood that the condition of the process of the present invention — i.e. duration, temperature, pH, composition of the medium or the like — can be selected to attain the best results depending on the nature and concentration of the starting material and used fungus. Usually, duration for 1–7 days, temperature of 20°–35° C, pH of 4–8 are preferably selected. These figures are those of a few instances and does not restrict the scope of this invention.

In many cases, the fungus belonging to the Fusarium genus does not only oxidatively cleave and degradate the spirostane side chain, but induces the other oxidative changes on the A-C rings or substituents therein, for example, hydroxylation, hydrolysis, dehydration, oxidation, dehydrogenation etc. These changes are sometimes more preferable for utilization of products of this invention. Among them, a combination of oxidation and dehydrogenation or dehydration which conducts the products summarized by the following general formula is especially useful:

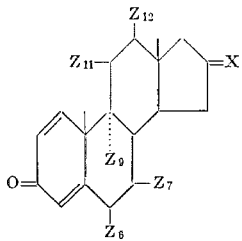

wherein X is

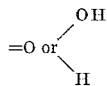

group, $Z_{6-12}$ each is a hydrogen atom or a hydroxy group or, excluding $Z_9$, represents an oxo group, and when $Z_{6-12}$ each is a hydrogen atom or a hydroxy group they each may be accompanied with an unsaturation between the neighboring carbon atom, whereby each configuration of $Z_{6-12}$ is $\alpha$ or $\beta$ except for $Z_9$ as $\alpha$. Specific examples of the products are 1,4-androstadiene-3,16-dione, 16($\alpha$ and $\beta$)-hydroxy-1,4-androstadien-3-one, 11($\alpha$ and $\beta$)-hydroxy-1,4-androstadiene-3,16-dione, 11,16-dihydroxy-1,4-androstadien-3-one, 6-hydroxy-1,4-androstadiene-3,16-dione, 7-hydroxy-1,4-androstadiene-3,16-dione, 16-hydroxy-1,4-androstadiene-3,12-dione, 1,4-androstadiene-3,6,16-trione or the like.

Following the reaction, the reaction products may be recovered by any one of the conventional methods in the chemical industries. For instance, adsorption with an adsorbent such as alumina, silica gel, infusorial earth (Florisil), active charcoal or the like, followed by elution with a solvent system such as petroleum ether, benzene, chloroform, methanol or the like, or extraction of culture medium or mycelia with organic solvents such as chloroform, methylene chloride, ethylene chloride, acetic esters such as butyl acetate, diethyl ketone, butanol or the like can effectively be utilized. After recovery, the products may be isolated by concentration of the extracts to a small volume or the dryness. Purification of the crude products may be accomplished by the conventional techniques such as counter current distribution method, chromatography over alumina, silica gel or the like, or more conveniently by a simple recrystallization in a conventional manner.

The products of the present invention serve as valuable intermediates for production of various androstane and estrane series steroidal hormones such as androgens, estrogens, anti-androgens, anti-progestins, anti-estrogens, anti-lipemic agents, anti-DOCA agents or the like (e.g. testosterone, 16-estrone, estriol, estrone, estradiol, 1,3,5(10)-estratriene-3,16-diol, 3-hydroxy-1,3,5(10)-estratrien-16-one and its ketal acylates, 17-halo-1,3,5(10)-estratriene-3,16-diol, 17-halo-3-hydroxyl-1,3,5(10)-estratrien-16-one, 4-androstene-3,16-dione, 5$\alpha$-androstane-3,16-dione, 11,16-dihydroxy-16-ethynyl-4-androsten-3-one, 1,3,5(10)-estratrien-16-one, 1,3,5(10)-estratrien-16-ol, 16,17-epithio-1,4-androstadien-3-one, etc.). For example, 3,16-dioxoandrosta-1,4-diene may be converted into estrogenic 3-hydroxyestra-1,3,5(10)-trien-16-one by action of lithium in the presence of hydrogen donor by the process described in the Journal of the American Chemical Society Vol. 86, page 742 (1964). The latter may be converted into antilipemic and estrogenic 3-acylate-16-ketal derivatives as described in the U.S. Pat. No. 3,138,590; or the same compound may be converted into estrogenic 17-halo-3-hydroxy-1,3,5(10)-estratrien-16-one and alkyl ethers e.g. U.S. Pat. No. 3,079,408 by halogenation at position 17; or the same compound may be converted into antilipemic 16-oxoestra-1,3,5(10)-triene by the process of U.S. Pat. No. 3,081,316; 16-hydroxy-1,4-androstadien-3-one may be converted to antideoxycorticosteronic 16,17-epithio-1,4-androstadien-3-one by the method of U.S. Pat. No. 3,123,599; 11$\beta$-hydroxy-1,4-androstadiene-3,16-dione may be converted into useful 11,16-dihydroxy-16$\alpha$-ethynyl-4-androsten-3-one described in Belgian Pat. No. 591,544, through 11-hydroxy-4-androstene-3,16-dione by the process shown in Chemistry and Industry, page 300 (1962). Further, the compounds having 12-oxygen functions are conveniently derived from naturally occurring abundant sapogenins, e.g. hecogenin, by the process of this invention and the 12-oxygenated derivatives of this invention or the 12-oxygenated derivatives of the useful compounds described above may be converted into the 12-deoxygenated compounds by e.g. Wolff-Kishner method, Huang Minlon method, Clemensen reduction, etc., by e.g. the method of Shoppee "Chemistry of the Steroids," page 121, Butterworth & Co., Ltd. London (1964), if required after protection of oxygen functions other than that locating at position 12 or conversion of 12-oxygen function to 12-oxo group, etc., and said 12-oxygenated compounds are thus useful for synthesis of the useful compounds cited above. Thus the 12-oxo-16-estrone may be deoxygenated into 16-estrone, which may be ethynylated to afford hypochloesterolaemic 16$\alpha$-ethynyl-3,16$\beta$-dihydroxy-1,3,5(10)-estratriene disclosed in French Patent No. 5099M, Netherland Patent No. 65,00801; 11,16-dihydroxyandrosta-1,4-diene-3-one may be oxidized with an oxidizing agent e.g. N-bromoacetamide, Oppenauer reaction, by e.g. a method analogous to H. L. Herzog et al: the Journal of the American Chemical Society, Vol. 83, page 4073 (1961); 3,11-dihydroxy-1,3,5(10)-estratrien-16-one may be treated with dehydrating agent to 9(11)-ene compounds, followed by hydrogenation to obtain estrogenic 16-estrone by a method analogous to Berney J. Magerlein, John A. Hogg; Journal of the American Chemical Society, Vol. 80, page 2,220 (1958), which may be converted into hypochloresterolaemic 16$\alpha$-ethynyl-3,16$\beta$-dihydroxy-1,3,5(10)-estratriene by the known method described above.

The invention will be described in further detail in the following examples which are presented by way of illustration only and not as indicating the scope of the invention.

EXAMPLE 1

Into a medium consisting of 3.5 percent glucose, 2 percent peptone, 0.3 percent corn steep liquor (pH 5.6), there is inoculated *Fusarium solani* and propagated for 2 days at 26°–28° C with shaking to give seed culture. To a nutrient medium of the same composition (each 100 ml. per each of twenty 500 ml. -shaking flasks), the Fusarium solani seed culture (2 ml. in every flask) is added and cultured for 24 hours with shaking. Diosgenone (15 mg. in 0.8 ml. methanol per each flask) is added to the broth and cultured for another 3 days. The reaction mixture is adjusted to pH 3 with 5N-hydrochloric acid and extracted with ethyl acetate. The resultant extract is dissolved in chloroform and chromatographed over silica gel (30 g.). The eluate of chloroform-ether (50:2) is chromatographed over alumina (25 g.) to give benzene-ether (50:6) fraction, from which 3,16-dioxo-1,4-androstadiene (78.5 mg., 38.0 percent) is obtained. Mp. 140°–141° C. $[\alpha]_D^{24}$ −204.2±4°Φ (chloroform). Anal: Calcd. for $C_{19}H_{24}O_2$: C 80.24, H 8.51; Found: C 80.27, H 8.58. IR: $\nu_{max}$ 1,730, 1658, 1622, 1603 cm$^{-1}$. UV:$\lambda_{max}$ 245 m$\mu$ ($\epsilon$=15,400).

From the benzene-ether fraction and benzene fraction of the alumina chromatography, 151.8 mg. of the starting material is recovered.

EXAMPLE 2

To a nutrient medium of the same composition as in Example 1 (20 l.) in a 30 liter jar fermenter, there are added a defoaming agent (Uniol p-2,000, 15 ml.) and 500 ml. of Fusarium solani seed culture, obtained by the method as described in Example 1 and cultured for 24 hours at 27°–28° C under aeration (flow rate 20 l./min., gauge pressure 0.6–0.7 kg./cm², stirring frequency 250 r.p.m.). Diosgenone (2 g.) in methanol (260 ml.) is added to the broth and cultured for 3 days with vigorous stirring (400–500 r.p.m.). The reaction mixture is treated as in Example 1, and the resultant extract is chromatographed over silica gel (400 g.). The eluent of chloroform ether (50:1) is chromatographed again over alumina (75 g.) to give benzene and benzene-ether (50:2) fractions, from which 3,16-dioxo-1,4-androstadiene (846 mg., 61.6 percent) is obtained.

From the eluent of benzene-ether (100:25), 16$\beta$-hydroxy-1,4-androstadien-3-one (11 mg.) is obtained. Mp. 201°–202° C. $[\alpha]_D^{25}$ −15.8±4° (chloroform). Anal: Calcd. for $C_{19}H_{26}O_2$: C 79.68, H 9.15; Found: C 79.47, H 9.01. IR: $\nu_{max}$ 3390, 1654, 1617, 1602 cm$^{-1}$.

EXAMPLE 3

A nutrient medium (100 ml.) of the same composition as described in Example 1 is inoculated with Fusarium solani and cultured for 24 hours. Diosgenin (10 mg.) is added to the broth and cultured for 6 days. The reaction mixture is treated in the conventional manner and the resultant extract is purified by thin layer chromatography (over Kiesel Gel GF, with ethyl acetate-toluene(1:1)) to give 3,16-dioxo-1,4-androstadiene.

EXAMPLE 4

A nutrient medium (100 ml.) of the same composition as described in Example 1 is inoculated with Fusarium solani and cultured for 24 hours. Kryptogenin (10 mg.) is added to the broth and cultured for 3 days. The reaction mixture is treated in the conventional manner and the resultant extract is purified by thin layer chromatography (over Kiesel Gel GF, with ethyl acetate-toluene (1:1)) to give 3,16-dioxo-1,4-androstadiene (3.5 mg.).

EXAMPLE 5

A nutrient medium (100 ml.) of the same composition as described in Example 1 is inoculated with Fusarium solani and cultured for 24 hours. 5$\alpha$-Dihydrokryptogenin diacetate (20 mg.) is added to the broth and cultured for 5 days. The reaction mixture is treated in the conventional manner and the resultant extract is purified by thin layer chromatography as in the preceding Example to give 1,4-androstadien-3,16-dione(4.1 mg.), accompanied with recovery of the starting material (10 mg.).

EXAMPLE 6

$\Delta^1$-Diosgenone (10 mg.) is oxidized and isolated by thin layer chromatography as in Example 5 to give 1,4-androstadien-3,16-dione (4.2 mg.).

EXAMPLE 7

According to the similar manner as in Example 5, diosgenone (10 mg.) is oxidized with shaking to accumulate the degradation enzyme in the mycelia. The resultant mycelia are collected by centrifugation and thoroughly washed with a M/15 phosphate buffer solution (pH 7.2). The resultant washed mycelia are again suspended in a buffer solution of the same composition. Diosgenone (5 mg.) is added to the suspension and cultured at 26°–28° C for 2 days with shaking. The resultant extract is chromatographed over a thin layer (Kiesel Gel GF, with ethyl acetate toluene (1:1) to give 1,4-androstadien-3,16-dione.

EXAMPLE 8

A nutrient medium (100 ml.) of the same composition as described in Example 1 is inoculated with Fusarium solani and cultured for 24 hours. Tigogenone (10 mg.) is added to the broth and cultured for 6 days. The reaction mixture is treated in the conventional manner and the resultant extract is purified by thin layer chromatography (over Kiesel Gel GF, with ethyl acetate-toluene (1:1) to give 3,16-dioxo-1,4-androstadiene, accompanied with recovery of the starting material.

EXAMPLE 9

Diosgenone (40 g.) is treated in the similar manner as described in Example 2 in twenty 30 liter jar fermenters, and the resulting extract is chromatographed over silica gel (1.1 kg.). The eluent of chloroform-ether (93:7) is purified by chromatography over alumina to give 3,16-dioxo-1,4-androstadiene (18.3 g., 65.4 percent).

The fraction eluted by the solvent more polar than chloroform-ether (80:20) of the above mentioned silica gel chromatography, is repeatedly chromatographed over alumina to give 16$\beta$-hydroxy-1,4-androstadien-3-one (1.56 g., 5.6 percent) and 16$\alpha$-hydroxy-1,4-androstadien-3-one (1.29 g., 4.6 percent).

16$\alpha$-Hydroxy-1,4-androstadien-3-one: Mp. 186°–187° C. $[\alpha]_D$ −17.4±4° (chloroform). Anal: Calcd. for $C_{19}H_{26}O_2$: C 79.68, H 9.15 Found: C 79.97, H 9.37. IR: $\nu_{max}$ 3396, 1659, 1619, 1602 cm$^{-1}$. UV $\lambda$ 95%$_{max}$ 245.5 m$\mu$ ($\epsilon$=16,000).

EXAMPLE 10

The mycelia obtained by the method as described in Example 7 is homogenized to give the homogenate (including spore). Kryprogenone (1 mg.) is added into a mixture of 30 ml. of M/15 phosphate buffer solution and 10 ml. of the homogenate and incubated at room temperature for 1 hour. The mixture is extracted with ethyl acetate and the extract is chromatographed over thin layer of silica gel (Kiesel Gel GF) with ethyl acetate-toluene system (1:1) to give 3,16-dioxo-1,4-androstadiene.

EXAMPLE 11

According to the similar procedure to the above Examples 3, 4, 5 or 8, $\Delta^1$-kryptogenone, $\Delta^4$-tigogenone, $\Delta^{1,4}$-tigogenone, kryptogenone, sarsasapogenin, $\Delta^{1,4}$-sarsasapogenone, smilagenin, smilagenone, $\Delta^4$-smilagenone, $\Delta^{1,4}$-smilagenone, yamogenin, yamogenone and $\Delta^1$-yamogenone each affords 1,4-androstadiene-3,16-dione.

EXAMPLE 12

A nutrient medium (100 ml. in each of ninety two flasks) of the same composition as described in Example 1 is inoculated with Fusarium solani and cultured for 24 hours. Hecogenin (2.76 g., 30 mg in each flash) is added to the broth and cultured for 7 days. The reaction product is extracted with ethyl acetate, and the resultant extract (4.3 g) is repeatedly chromatographed over silica gel (150 g.) to afford 1,4-androstadiene-3,12,16-trione, 16$\alpha$-hydroxy-1,4-androstadiene-3,12-dione, 12$\alpha$-hydroxy-1,4-androstadiene-3,16-dione, 16$\alpha$-hydroxy-5$\alpha$-androstene-3,12-dione and 12$\alpha$-hydroxy-5$\alpha$-androst-1-ene-3,16-dione.

1,4-Androstadiene-3,12-16-trione: mp. 233°–234° C. $[\alpha]_D^{23}$ −105.7±4° (chloroform). UV: $\lambda_{max}$ 244 m$\mu$ ($\epsilon$ = 15600). IR: $\nu_{max}$ 1740, 1715, 1667, 1623, 1606 cm$^{-1}$. Anal. Calcd. for $C_{19}H_{22}O$: C 76.48, H 7.43; Found: C 76.56, H 7.75.

16$\alpha$-Hydroxy-1,4-androstadiene-3,12-dione: mp. 234–235° C. $[\alpha]_D^{23}$ +68.7±0.6° (chloroform). UV: $\lambda_{max}$ 244 m$\mu$ ($\epsilon$= 15000). IR: $\nu_{max}$ 3334, 1714, 1669, 1624, 1609 cm$^{-1}$. Anal. Calcd. for $C_{19}H_{24}O_3$: C 75.97, H 8.05; Found: C 75.83, H 8.27.

16α-Acetyloxy-1,4-androstadiene-3,12-dione: mp. 169°–171° C, prepared according to the conventional acetylation using acetic anyydride in pyridine from the corresponding 16-hydroxy-1,4-androstadiene-3,12-dione. $[\alpha]_D^{23}$+27.6±0.6° (chloroform). UV: $\lambda_{max}$ 243.5 mμ (∈=1600). IR: $\nu_{max}$ 1740, 1712, 1664, 1625, 1604, 1253, 1250 cm⁻¹. Anal. Calcd. for $C_{21}H_{26}O$: C 73,66 H 7.66; Found: C 73.40, H 7.50.

12α-Hydroxy-1,4-androstadiene-3,16-dione: mp. 226–227° C. $[\alpha]_D^{23}$ −160.4±1° (chloroform). UV: $\lambda_{max}$ 245.5 mμ (∈=15600). IR: $\nu_{max}$ 3386, 1744 1664, 1620, 1603 cm⁻¹. Anal. Calcd. for $C_{19}H_{24}O_3$: C 75.97, H 8.05; Found: C 76.24, H 8.18.

Acetate of the above: mp. 106°–108° C. IR: $\nu_{max}$ 1741, 1736, 1712, 1659, 1622, 1601, 1253, 1239 cm⁻¹. Anal. Calcd. for $C_{21}H_{26}O_4$: C 73.66, H 7.66; Found: C 73.69, H 7.94.

12α-Hydroxy-5α-androst-1-ene-3,16-dione: mp. 240°–242° C. $[\alpha]_D^{25}$ −100.4±2.4° (chloroform). UV: $\lambda_{max}$ 230.5 mμ (∈=10770). IR: $\nu_{max}$ 3456, 1734, 1664, 1647, 1595 cm⁻¹. Anal.Calcd. for $C_{19}H_{26}O_3$: C 75.46, H 8.67; Found: C 75.71, H 8.86.

Acetate of the above: mp 199°–200° C. $[\alpha]_D^{25}$ −36.9±1.1° (Chloroform). UV: ʼ 229.5 mμ (∈=10630). IR: $\nu_{max}$ 1744, 1731, 1689, 1600 cm⁻¹. Anal.Calcd. for $C_{21}H_{28}O_4$: C 73.22, H 8.19; Found: C 72.41, H 8.29.

16α-Hydroxy-5α-androst-1-ene-3,12-dione: mp. 226°–228° C. $[\alpha]_D^{26}$ +109.7±2.70° (chloroform). UV: $\lambda_{max}$ 228.5 mμ(∈=11160). IR: $\nu_{max}$ 3478, 1691, 1676, 1606 cm⁻¹. Anal. Calcd. for $C_{19}H_{26}O_3$: C 75.46, H 8.67; Found: C 75.58, H 8.67.

Acetate: mp. 199°–200° C. $[\alpha]_D^{25}$ +77.3±2° (chloroform). UV: $\lambda_{max}$ 228.5 mμ(∈=11100). IR: $\nu_{max}$ 1726, 1704, 1687, 1604, 1256 cm⁻¹. Anal. Calcd. for $C_{21}H_{28}O_4$: C 73.22, H 8.19; Found: C 73.56, H 8.21

Oxidation of the above 12α-hydroxy-1,4-androstadiene-3,16-dione or 16α-hydroxy-1,4-androstadiene-3,12-dione with chromium trioxide in acetone gives 1,4-androstadiene-3,12,16-trione.

Oxidation of 12α-hydroxy-5α-androst-1-ene, 3,16-dione or 16α-hydroxy-5α-androst-1-ene-3,12-dione with chromium trioxide in acetone gives 5α-androst-1-ene-3,12,16-trione: mp. 218°–219° C. $[\alpha]_D^{26}$ −66.5±1.8° (chloroform). UV: $\lambda_{max}$ 228.5 mμ (∈=10930). IR: $\nu_{max}$ 1737, 1714, 1669, 1609 cm⁻¹. Anal. Calcd. for $C_{19}H_{24}O_3$: C 75.97, H 8.12; Found: C 76.05, H 8.05.

EXAMPLE 13

According to the similar procedure to the above Example 12, botogenin, 3-dehydrobotogenin (botogenone), Δ¹-botogenone, hecogenone (3-dehydrohecogenin), Δ⁴-hecogenone,Δ¹,⁴-hecogenone, neobotogenin, neohecogenin, gentrogenin, gentrogenone, ricogenin, sisalagenin and jimogenin each affords 1,4-androstadiene-3,12,16-trione.

EXAMPLE 14

According to the similar procedure to the above Examples 3, 4, 5 or 8, nogiragenin, nogiragenone (3-dehydronogiragenin), Δ⁴-nogiragenone, Δ¹,⁴-nogiragenone, sarmentogenin, 3-dehydro-sarmentogenin, 3-dehydro-Δ⁴-sarmentogenin and 3-dehydro-Δ¹,⁴-sarmantogenin each affords 11,16-dihydroxy-1,4-androstadien-3-one, 11α(and β)-hydroxy-1,4-androstadiene-3,16-dione and 1,4-androstadiene-3,11,16-trione, and sarmutogenin affords 1,4-androstadiene-3,11,16-trione.

EXAMPLE 15

According to the similar procedure to the above Examples 3, 4, 5 or 8, manogenin, gitogenin, tokorogenin, yonogenin and their 3-dehydro derivatives each affords several spots being revealed to the corresponding androstane products.

EXAMPLE 16

To a solution of 1,4-androstadiene-3,16-dione (300 mg.) in methanol (115 ml.) is added sodium borohydride (58 mg.) and let stand for 50 minutes at 0° C. The reaction mixture is treated in the conventional manner to give the extract (362 mg. ), which is chromatographed over alumina (15 g.). The fraction eluted with benzene affords 16β-hydroxy-1,4-androstadien-3-one (269 mg.) and the fraction eluted with ether affords 16α-hydroxy-1,4-androstadien-3-one (10 mg.).

16β-Hydroxy-1,4-androstadien-3-one: mp. 201°–202° C. $[\alpha]_D^{22.5}$ −15.2±4° (chloroform). UV: $\lambda_{max}$ 245.5 mμ (∈=16000). IR: $\nu_{max}$ 3390, 1654, 1617, 1602 cm⁻¹. Anal. Calcd. for $C_{19}H_{26}O_2$: C 79.68, H 9.15; Found: C 79.47, H 9.01.

16 α-Hydroxy-1,4-androstadien-3-one: mp. 186°–187° C. $[\alpha]_D^{25}$−17.4±4° (chloroform). UV: $\lambda_{max}$ 245.5 mμ (∈=16000). IR: $\nu_{max}$ 3396, 1659, 1619, 1602 cm⁻¹. Anal. Calcd. for $C_{19}H_{26}O_2$: C 79.68, H 9.15; Found: C 79.97, H 9.37.

Each 16-hydroxy product affords the corresponding acetate by the conventional acetylation method with acetic acid in pyridine.

16β-Acetate: mp. 100°–101° C. $[\alpha]_D^{25}$−22.4±4° (chloroform). UV: $\lambda_{max}$ 245.5 mμ (∈=16100). IR: $\nu_{max}$ 1733, 1664, 1624, 1604 cm⁻¹. Anal. Calcd. for $C_{21}H_{28}O_3$: C 76.79, H 8.59; Found: C 76.97, H 8.84.

16α-Acetate: IR: $\nu_{max}$ 4 1737, 1666, 1632, 1607 cm⁻¹.

EXAMPLE 17

To a solution of 1,4-androstadiene-3,16-dione (50 mg.) in benzene (5 ml.) and 2-butanol (0.5 ml.), aluminum isopropoxide (32mg) is added and refluxed for 5 hours. The reaction mixture is chromatographed over alumina (3 g.) to give 16β-hydroxy-1,4-androstadien-3-one (14 mg.) and 16α-hydroxy-1,4-androstadien-3-one (9 mg.).

EXAMPLE 18

To a solution of 1,4-androstadiene-3,16-dione (1 g.) in butanone ethylene ketal, p-toluenesulfonic acid (25 mg.) is added and heated for 22.5 hours with azeotropical distillation. The reaction product is treated in the conventional manner to give the corresponding ethylene ketal.

Biphenyl (1 g.) is dissolved in tetrahydrofuran (25 ml.) and added with lithium metal (100 mg.), and stirred for 20 minutes under reflux. The colored solution is added with diphenylmethane (0.5 ml.) and 1,4-androstadiene-3,16-dione 16-ethylene ketal (prepared above) in tetrahydrofuran (10 ml.) is added dropwise and refluxed for 35 minutes with stirring. The reaction mixture is added with methanol and water, acidified with hydrochloric acid (2 ml.) and let stand for 30 minutes at 60° C. The reaction product is extracted with chloroform and purified by chromatography over silica gel (100 g.) to give 3-hydroxy-1,3,5(10)-estratrien-16-one (16-estrone) (134.3 mg.). Np. 248°–249° C. $[\alpha]_D^{23}$−99.5±4° (ethanol). UV: $\lambda_{max}$ 281.5 mμ (∈=2190), 287.5 mμ (∈=1920). IR: $\nu_{max}$ 3380,1720, 1608, 1582, 1499 cm⁻¹. Anal. Calcd. for $C_{18}H_{22}O_2$: C 79.96, H 8.20; Found: C 79.59, H 8.10.

The product (30 mg.) is acetylated with acetic anhydride in pyridine to give the corresponding 3-acetate (18.7 mg.): mp. 132°–133° C. $[\alpha]_D^{22}$−91.7±4° (ethanol). IR: $\nu_{max}$ 1760, 1734, 1615, 1582, 1496 cm⁻¹. Anal. Calcd. for $C_{20}H_{24}O_3$: C 76.89, H 7.74; Found: C 76.60, H 7.70.

EXAMPLE 19

To a solution of 16β-hydroxy-1,4-androstadien-3-one (250 mg.) in dihydropyran (7 ml.), phosphoryl chloride (2 drops) is added and let stand for 1.5 hours to give the corresponding 16-tetrahydropyranyl ether. The product is treated as the preceding Examples with tetrahydrofuran (5.5 g.), biphenyl (475 mg.), lithium metal (35 mg.) and diphenylmethane (1 drop), and hydrolyzed with concentrated hydrochloric acid as above to give 3,16β-dihydroxy-1,3,5(10τ-estratriene: mp. 230°–231° C. $[\alpha]^{22}$ +72 (ethanol). IR: $\nu_{max}$ 3528, 3238, 160 , 1506 cm⁻¹. Anal. Calcd. for $C_{18}H_{24}O_2$: C 79.39, H 8.88; Found: C 78.73, H 8.74.

The product is oxidized with chromium trioxide in acetone to give 3-hydroxy-1,3,5(10)-estratrien-16-one: mp. 248°–249° C.

EXAMPLE 20

16α-Hydroxy-1,4-androstadien-3-one (100 mg.) is treated in the same manner as above Example 19 to give 3,16α-dihydroxy-1,3,5(10)-estratriene: mp. 228°–229° C. $[\alpha]_D^{22}$ +80±4° (ethanol). IR: $\nu_{max}$ 3372, 3125, 1613, 1503 cm⁻¹. Anal. Calcd. for $C_{18}H_{24}O_2$: C 79.39, H 8.88; Found: C 77.60, H 8.48.

EXAMPLE 21

A mixture of 3-hydroxy-1,3,5(10)-estratrien-16-one (30 mg.), methanol (11.5 ml.) and sodium borohydride (6 mg.) is let stand for 50 minutes at 0° C. The reaction product is isolated and purified to give 3,16β-dihydroxy-1,3,5(10)-estratriene (19.8 mg.) and 3,16α-dihydroxy-1,3,5(10)-estratriene.

EXAMPLE 22

According to the similar procedure to the above Examples 18–21, the following conversions are carried out: 1,4-androstadiene-3,12,16-trione to 3-hydroxy-1,3,5(10)-estratriene-12,16-dione, 16α-hydroxy-1,4-androstadiene-3,12-dione to 3,16α-dihydroxy-1,3,5(10)-estratrien-12-one, 12α-hydroxy-1,4-androstadiene-3,16-dione to 3,12α-dihydroxy 1,3,5(10-estratrien-16-one, 1,3,5(10 )-estratriene-3,12α, 16α-triol and 1,3,5(10)-estratriene-3,12α, 16β-triol, 11(α or β)-hydroxy-1,4-androstadiene-3,16-dione to 3,11-dihydroxy-1,3,5(10)-estratrien-16-one, and 11,16-dihydroxy-1,4-androstadien-3-one to 1,3,5(10)-estratriene-3,11,16-triol.

EXAMPLE 23

To a solution of 3,12,16-trioxoandrosta-1,4-diene (240 mg) in ethylene glycol (25 ml) is added p-toluene-sulfonic acid monohydrate (7 mg) and the mixture is heated at 70° –80° C at 5 mm Hg for one hour, while the mixture is concentrated to 70 ml. The reaction mixture is alkalinified with a solution of potassium hydroxide in ethanol and poured into water. The crystals separated out is filtrated, dissolved in dichloromethane and washed with water, dried and evaporated to give 3,12,16-trioxoandrosta-1,4-diene-16-ethylene ketal.

The latter compound is dissolved in a mixture of triethylene glycol (10 ml), 98.5 percent hydrazine (5 ml) and hydrazine hydrochloride (1.4 g), and heated on a bath at 140° C for one hour and then is added potassium hydroxide (3 g) and heated further one hour at 190° C and ten minutes at 210° C. The reaction mixture is poured into ice-water and extracted with chloroform. The extract solution is washed with water, dried and evaporated. The residue is recrystallized from ether hexane to give 3,16-dioxoandrosta-1,4-diene-16-ethylene ketal.

The product is dissolved in 70 percent acetic acid and heated on a boiling water bath for one hour. The reaction mixture is diluted with water and extracted with chloforom. The extract is washed with 5 percent aqueous solution of sodium carbonate and water, dried and evaporated. The residue is recrystallized from a mixture of acetone and hexane to give 103 mg 3,16-dioxandrosta-1,4-diene, m.p. 140° – 141°C.

In a similar manner, 3-hydroxyestra-1,3,5(10)-triene-12,16-dione is converted into 3-hydroxyestra-1,3,5(10)-trien-16-one, m.p. 248° – 249° C, which is then treated with acetylene and potassium methylate to give 3,16β-dihydroxy-16α-ethynylestra-1,3,5(10)-triene.

EXAMPLE 24

To a solution of 95 mg 12-oxo-1,3,5(10)-estratriene-3,16β-diol in ether (10 ml), is added a solution of diazomethane in dry ether. The solution is evaporated in vacuo, and the residue is dissolved in ether and washed with water, dried over anhydrous sodium sulfate and evaporated. The residue is dissolved in a mixture of 98.5 percent hydrazine (3 ml) and hydrazine hydrochloride (0.8 g) in triethylene glycol (5 ml) and the mixture is heated on a bath at 140° C for two hours and then is added potassium hydroxide (1.5 g) and heated further one hour at 190° C and 30 minutes at 210° C. The reaction mixture is poured into ice-water and extracted with chloroform. The extract solution is washed with water, dried and evaporated. Recrystallization of the residue from a mixture of ether and hexane affords 1,3,5(10)-estratriene-3,16β-diol 3-methyl ether.

EXAMPLE 25

To a solution of 3,12α-dihydroxyestra-1,3,5(10)-trien-16-one (100 mg) in acetone (10 ml) is added Jones reagent until the color of chromium trioxide does not disappear. The mixture is poured into water, and extracted with chloroform. The extract solution is washed with water, dried and evaporated to give 12,16-dioxo-estra-1,3,5(10)-trien-3-ol (90 mg).

In a similar manner, 1,3,5(10)-estratriene- 3,16-diol is oxidized with chromium trioxide to obtain 16-oxo-1,3,5(10)-estratrien-3-ol.

EXAMPLE 26

A solution of 3,11-dihydroxy-16-oxo-1,3,5(10)-estratriene (50 mg) in a mixture of ethanol (4 ml) and 10 percent aqueous solution of sulfuric acid (2 ml) is refluxed for five hours on a water bath. The reaction mixture is extracted with methylene chloride. The extract solution is washed with water, dried and evaporated. The residue is dissolved in ethanol (5 ml) and shaken in the hydrogen atmosphere with a suspension of palladium charcoal in ethanol for five hours. The suspension is filtrated and concentrated to dryness. Crystallization of the residue from ether and pentane affords 16-oxoestra-1,3,5(10)-trien-3-ol, m.p. 140° – 141° C.

In a similar manner, 1,3,5(10)-estratriene-3,11,16α-triol is converted into 1,3,5(10)-estratriene-3,16α-diol, m.p. 228° – 229° C.

EXAMPLE 27

To a solution of 11,16-dihydroxyandrosta-1,4-dien-3-one (0.54 g) in a mixture of acetone (40 ml), methanol (10 ml) and water (10 ml) at room temperature is added N-bromoacetamide (1.93 g). After standing for three hours in the dark at 5° – 10° C, the reaction mixture is poured into 5 percent aqueous solution of sodium sulfate and the product is extracted with methylene chloride. The dried extract solution is concentrated and the residual oil is recrystallized from a mixture of ether and hexane to afford 3,16-dioxoandrosta-1,4-dien-11-ol.

The product is dissolved in a mixture of tetrahydrofuran (15 ml) and ether (15 ml) and the solution is added dropwise into a solution of potassium metal (880 mg) in a mixture of tetrahydrofuran (15 ml) and ether (15 ml) saturated with acetylene gas. The mixture is bubbled with acetylene gas for 3 hours and then aqueous ammonium chloride is added thereto. The reaction mixture is washed successively with water, aqueous sodium carbonate solution and water, dried and evaporated in vacuo. Recrystallization of the residue from a mixture of acetone and pentane affords 3,11,16-trihydroxy-16-ethynylandrosta-1,4-diene.

A mixed solution of lithium (60 mg) and biphenyl (1,2 g) in tetrahydrofuran (20 ml) is stirred for two hours at room temperature. Into the solution cooled at −65° C is added 3,11,16-trihydroxy-16-ethynylandrosta-1,4-diene obtained above and the mixture is stirred for 45 minutes at the temperature. Then ammonium chloride (2 g) is added thereto, and the temperature is raised gradually to −40° C during 2 hours. The reaction mixture is poured into saturated aqueous solution of ammonium chloride (20 ml) and extracted with methylene chloride. The extract solution is washed with water, dried and evaporated in vacuo. Purification of the residue by chromatography over alumina and recrystallization from a mixture of ethyl acetate and ether affords 3,11β,16β-trihydroxy-16α-ethynylandrost-4-ene.

What we claim is:

1. A compound of the formula

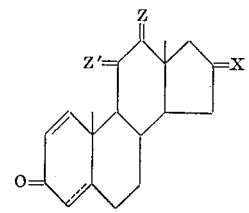

wherein X is oxo, lower alkylenedioxy, di(lower alkoxy), or

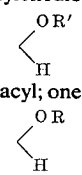

in which R' is hydrogen or acyl; one of Z and Z' is oxo or

in which R is hydrogen or acyl, and the other is

the dotted line represents the presence or absence of a double bond.

2. A compound according to claim 1, namely, 1,4-androstadiene-3,12,16-trione.

3. A compound according to claim 1, namely, 16α-hydroxy-1,4-androstadiene-3,12-dione.

4. A compound according to claim 1, namely, 12α-hydroxy-1,4-androstadiene-3,16-dione.

5. A compound according to claim 1, namely, 16α-hydroxy-5α-androst-1-ene-3,12-dione.

6. A compound according to claim 1, namely, 12α-hydroxy-5α-androst-1-ene-3,16-dione.

7. A compound according to claim 1, namely, 11 (α or β)-hydroxy-1,4-androstadiene-3,16- dione.

8. A compound according to claim 1, namely, 11,16-dihydroxy-1,4-androstadien-3-one.

9. A compound of the formula

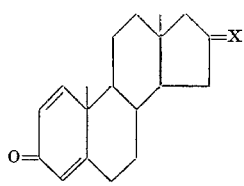

wherein X = 0, a lower alkylenedioxy group, di(lower alkoxy) group or

and R' is a hydrogen atom or an acyl group.

10. A compound according to claim 9, namely, 1,4-androstadiene-3,16-dione.

11. A compound according to claim 9, namely, 16α-hydroxy-1,4-androstadien-3-one.

12. A compound according to claim 9, namely, 16β-hydroxy-1,4-androstadien-3-one.

13. A compound of the formula

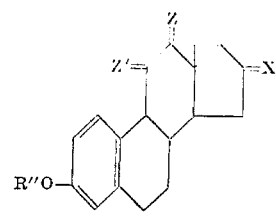

wherein R'' is hydrogen, lower alkyl or acyl; X is oxo or

one of Z and Z' is oxo or

and the other is

14. A compound according to claim 13, namely, 3-hydroxy-1,3,5(10)-estratriene-12,16-dione.

15. A compound according to claim 13, namely, 3,16-dihydroxy-1,3,5(10)-estratrien-12-one.

16. A compound according to claim 13, namely, 3,12α-dihydroxy-1,3,5(10)-estratrien-16-one.

17. A compound according to claim 13, namely, 3,11-dihydroxy,1,3,5(10)-estratrien-16-one.

18. A compound according to claim 13, namely, 1,3,5(10)-estratriene-3,11,16-triol.

* * * * *